United States Patent
McCoy et al.

(10) Patent No.: US 11,157,111 B2
(45) Date of Patent: Oct. 26, 2021

(54) ULTRAFINE LED DISPLAY THAT INCLUDES SENSOR ELEMENTS

(71) Applicant: Sony Interactive Entertainment LLC, San Mateo, CA (US)

(72) Inventors: Charles McCoy, San Mateo, CA (US); True Xiong, San Mateo, CA (US); Blaine Morgan, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 693 days.

(21) Appl. No.: 15/689,886

(22) Filed: Aug. 29, 2017

(65) Prior Publication Data
US 2019/0064953 A1 Feb. 28, 2019

(51) Int. Cl.
*G06F 3/042* (2006.01)
*G09G 3/32* (2016.01)
(Continued)

(52) U.S. Cl.
CPC .............. *G06F 3/042* (2013.01); *G06F 3/017* (2013.01); *G06F 3/0304* (2013.01); *G06F 3/0308* (2013.01); *G06F 3/038* (2013.01); *G06F 3/0386* (2013.01); *G06F 3/03542* (2013.01); *G06F 3/0421* (2013.01); *G06F 3/0488* (2013.01); *G06F 3/04883* (2013.01); *G09G 3/32* (2013.01); *G09G 3/344* (2013.01); *H04N 1/19* (2013.01);
(Continued)

(58) Field of Classification Search
CPC ......... G09G 2300/0236; G09G 3/2074; G09G 3/3607; G09G 3/364; G09G 3/344; G09G 3/3446; G09G 2300/023; G09G 2300/0456; G09G 2360/148; G09G 2360/14–148; G09G 2300/0443–0452; H04N 1/19–19594; H04N 1/00–648; G06K 9/00006–00093; G06K 9/0006; G06F 3/0386; G06F 3/0304; G06F 3/0308; G06F 3/017; G06F 3/03542; G06F 3/042–0428; G06F 2203/04101; G06F 2203/04808; G06F 3/03545; G06F 3/0481; G06F 3/04812; G06F 3/041–04897; G06F 3/0421; G06F 3/0412; H01L 27/3234; G02F 1/167; G01C 3/00–32
USPC ....... 345/4–6, 694, 107, 173–183, 695, 104; 382/321–324, 124–127; 359/296; 715/856–862
See application file for complete search history.

(56) References Cited

U.S. PATENT DOCUMENTS

| | | | |
|---|---|---|---|
| 6,188,388 B1 * | 2/2001 | Arita | G06F 3/03542 345/158 |
| 2006/0011913 A1 * | 1/2006 | Yamazaki | G09G 3/32 257/59 |

(Continued)

FOREIGN PATENT DOCUMENTS

CN 104009067 A * 8/2014 ........... G06F 3/0428

*Primary Examiner* — Amr A Awad
*Assistant Examiner* — Aaron Midkiff
(74) *Attorney, Agent, or Firm* — John L. Rogitz

(57) ABSTRACT

In one aspect, an LED display includes a matrix of LED pixels for producing a demanded image, and within the matrix, one or more sensor elements to detect visible light for document scanning, and/or IR light, and/or laser light. IR emitters also can be part of the matrix for time-of-flight based distance measurements using the matrix. The matrix background can be black or it can be e-ink to present, e.g., interactive user controls.

18 Claims, 5 Drawing Sheets

(51) Int. Cl.
 *G06F 3/0488* (2013.01)
 *G06F 3/03* (2006.01)
 *G06F 3/0354* (2013.01)
 *H04N 1/19* (2006.01)
 *G09G 3/34* (2006.01)
 *G06F 3/01* (2006.01)
 *G06F 3/038* (2013.01)

(52) U.S. Cl.
 CPC ............... *G06F 2203/04101* (2013.01); *G09G 2300/0452* (2013.01)

(56) References Cited

U.S. PATENT DOCUMENTS

| | | | | |
|---|---|---|---|---|
| 2009/0267895 A1* | 10/2009 | Bunch | | G06F 3/0386 345/157 |
| 2010/0141826 A1* | 6/2010 | Thorn | | G03B 13/32 348/345 |
| 2011/0052011 A1* | 3/2011 | Paillet | | H04N 5/3355 382/115 |
| 2011/0063213 A1* | 3/2011 | Kang | | G06F 3/042 345/158 |
| 2011/0063321 A1* | 3/2011 | Jang | | G06F 3/03545 345/592 |
| 2012/0006978 A1* | 1/2012 | Ludwig | | G06F 3/0425 250/214.1 |
| 2012/0060089 A1* | 3/2012 | Heo | | G06F 3/1431 715/702 |
| 2013/0231046 A1* | 9/2013 | Pope | | G06K 9/00013 455/41.1 |
| 2014/0118246 A1* | 5/2014 | Park | | G06F 3/0304 345/156 |
| 2015/0006106 A1* | 1/2015 | Ishikawa | | G06F 3/017 702/150 |
| 2015/0331508 A1* | 11/2015 | Nho | | G06F 3/042 345/173 |
| 2017/0078513 A1* | 3/2017 | Chang | | G06F 3/0488 |
| 2017/0123542 A1* | 5/2017 | Xie | | H01L 27/3227 |
| 2017/0242533 A1* | 8/2017 | Liu | | G06K 9/00013 |
| 2017/0255337 A1* | 9/2017 | Drumm | | G06F 3/0488 |
| 2017/0310940 A1* | 10/2017 | Perdices-Gonzalez | | G09G 3/2096 |
| 2017/0372114 A1* | 12/2017 | Cho | | G01J 1/0219 |
| 2018/0149751 A1* | 5/2018 | Geiger | | G01S 7/4814 |

* cited by examiner

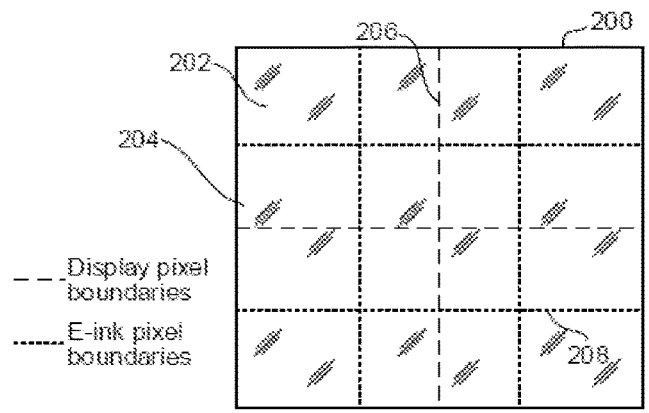
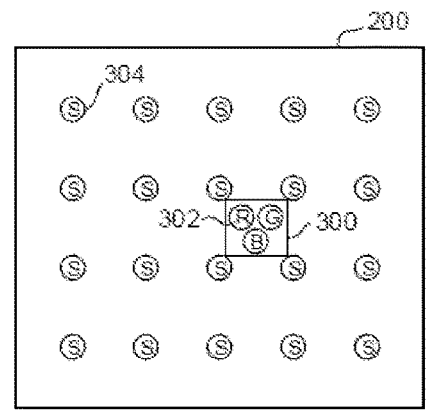
FIG. 2　　　　　　　　　　FIG. 3
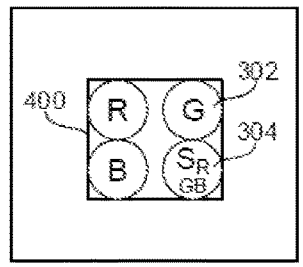 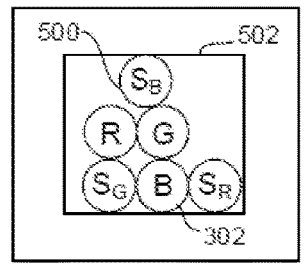 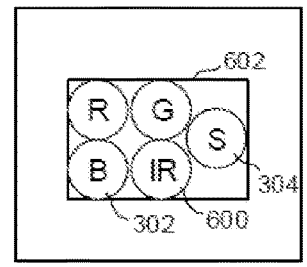
FIG. 4　　　　　　　FIG. 5　　　　　　　FIG. 6
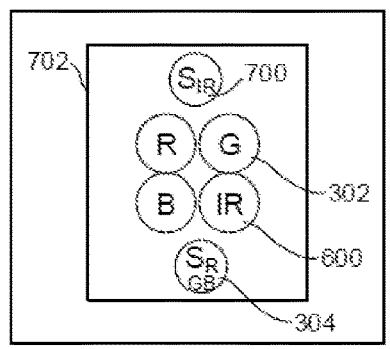　　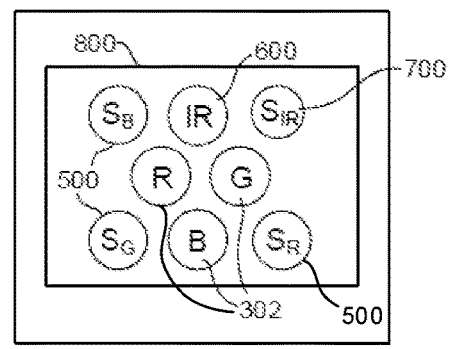
FIG. 7　　　　　　　　　　FIG. 8

Same FOV

Different FOV

ULTRAFINE LED DISPLAY THAT INCLUDES SENSOR ELEMENTS

FIELD

The application relates to systems and methods for an ultrafine LED display that includes sensor elements.

BACKGROUND

Present principles understand that current computer displays for presenting demanded images using light emitters such as liquid crystals or light emitting diodes typically do not receive input apart from touch input. As understood herein, it would be advantageous to use such displays for purposes beyond receiving touch input.

SUMMARY

Accordingly, in one aspect an apparatus includes at least one array of light emitting pixel elements controllable to present demanded images, and at least one light sensor in the array and configured to detect light.

The pixel elements may include red, green, and blue light emitting diodes (LED) and the apparatus can include plural light sensors configured for outputting signals representing a scanned image.

In some examples, an e-ink substrate is juxtaposed with the pixel elements and light sensor, and at least one processor is configured with executable instructions to control the pixel elements to present the demanded image and to present on the e-ink substrate an image of an object based on signals from the at least one light sensor.

In example implementations, the light sensor is an infrared (IR) detector, and the apparatus includes at least one processor configured with executable instructions to determine that an object is juxtaposed with the array for scanning an image thereof based on signals from the IR detector.

In non-limiting implementations, the apparatus includes at least one laser emitter.

In some embodiments, the light sensor includes at least one laser detector, and the apparatus includes at least one processor configured with executable instructions to activate at least one-pixel element to indicate a laser pointer spot location based on signals from the laser detector.

In example embodiments, the pixel elements establish a screen pixel, and the apparatus includes a respective sensor element for each screen pixel. In other embodiments, the apparatus includes at least two respective sensor elements for at least one screen pixel. In still other embodiments the apparatus includes a respective sensor element for some, but not all, screen pixels.

In an example implementation, the pixel elements establish a screen pixel defining a first field of view (FOV), and the sensor element defines a second FOV that is the same as the first FOV. In another example implementation, the pixel elements establish a screen pixel defining a first FOV, and the sensor element defines a second FOV that is different than the first FOV.

In another aspect, an apparatus includes at least one computer storage that is not a transitory signal and that in turn includes instructions executable by at least one processor to control an array of pixel elements of a display to present demanded images. The instructions also are executable to, based on signals received from sensors in the array, scan an object juxtaposed with the display to generate an image of the object.

In another aspect, a method includes presenting demanded images using pixel elements of a display, and scanning a document positioned against the display using signals from light sensors arranged among the pixel elements.

The details of the present application, both as to its structure and operation, can best be understood in reference to the accompanying drawings, in which like reference numerals refer to like parts, and in which:

BRIEF DESCRIPTION OF THE DRAWINGS

FIG. 2 is a schematic diagram of a display background implemented by e-ink;

FIG. 3 is a schematic diagram of a matrix of LED pixels for producing demanded images, showing only a single LED pixel for clarity, along with sensor elements in the matrix;

FIGS. 4-8 are schematic diagrams of example LED pixel element/sensor element combinations;

DETAILED DESCRIPTION

Figure 1:
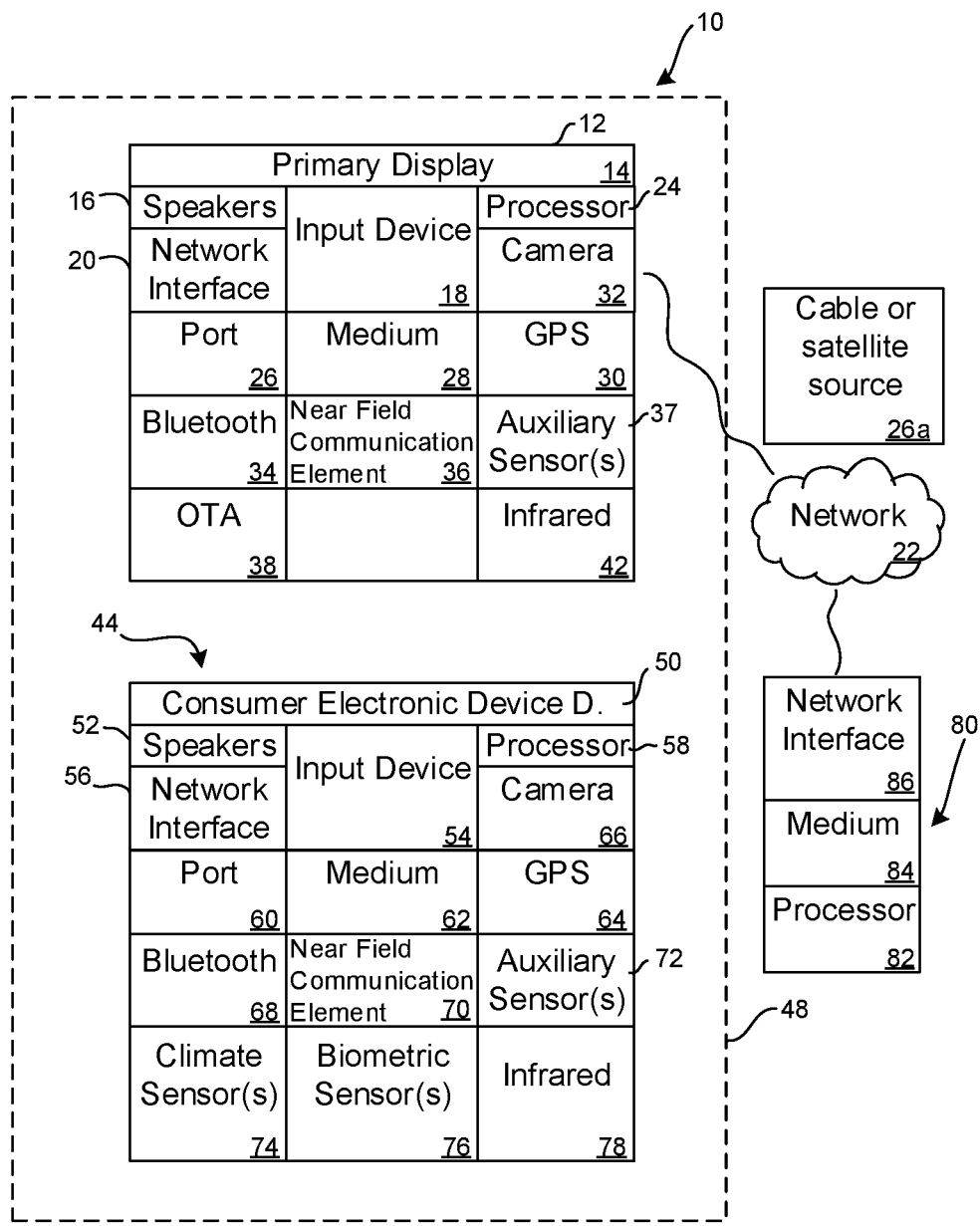
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

With the above in mind, attention is now drawn to FIG. 2, which illustrates a display 200 that may be used for any of the displays above. In the example shown, the display 200 includes four panels 202 of pixel elements and sensors as more fully described below, with the panels being snapping engaged with each other or joined by other means, it being understood that a single panel 202 may establish the entire display 200. The panels 202 of pixel elements and sensor elements may be positioned on a black background. In the example shown in FIG. 2, the panels are disposed on an e-ink background 204, shown below the panels 202, which are illustrated in transparency to show the e-ink background. Like the panels 202, the boundaries of which are illustrated by dashed panel lines 206, the e-ink background may be established by multiple e-ink panels, the boundaries of which are illustrated by dotted e-ink panel lines 208.

By using highly efficient light emitting elements, such as an ultra-fine LED, the portion of each pixel that is occupied by the light emitting elements can be minimized so that the majority of what the viewer sees when looking at the pixel when no light is being emitted is the light reflected off of the background around the light emitting elements. This allows an e-ink image displayed behind the pixels to be clearly visible through the display. The display can be built such that there is one e-ink pixel for every display pixel, or the display can be built with different resolutions for the e-ink pixels and the display pixels.

The display 200 may be built into a desk/table top/work surface. Or, it may serve as a more conventional display such as a TV screen or display wall. The display 200 can also be incorporated into a curved surface (such as a vehicle body) or fabric (clothing, rolled up screen). The display can even be built into a glass wall, for collaborative meetings and high-tech displays. The display 200 may be implemented as a display screen, e.g., on a wireless telephone or tablet computer.

FIG. 3 illustrates that the display 200 may include an array of pixels 300 (only one pixel 300 shown for clarity) that are arranged in a matrix of rows and columns and that are controlled by any of the processors described herein to present demanded images on the display. The demanded images typically include still or video pictures, graphics, and the like. Typically, each pixel 300 is established by three or four sub-pixels 302. In the example shown, each pixel 300 includes a red, a green, and a blue sub-pixel 302. A yellow sub-pixel may also be provided in some embodiments. The sub-pixels 302 are light emitters that may be established by liquid crystals or light emitting diodes (LED) or a combination thereof, and the display 200 may be an ultrafine LED display in example embodiments.

Located among the pixels 300 are one or more sensors 304. In the example shown, the sensors 304 are arranged on a one-to-one basis with the pixels 300 in the array of rows and columns. In other examples, multiple sensors 304 are provided for each pixel 300. In other examples, some pixels 300 do not have sensors 304 nearby or otherwise associated with them.

The sensors 304 may be light sensors such as but not limited to photovoltaic sensors, photo-emissive sensors, photoresistor sensors, photo-conductor sensors, including photoconductive cells, photo-junction devices, and photovoltaic cells, and combinations thereof. Other sensor types may additionally or alternatively be used as more fully set forth below.

Each sensor 304 may be composed of a single element that is sensitive to a broad spectrum of light. The light emitting elements (pixels 300) can be of known modulation so that the level being sensed from demanded image light from the pixels that reflects off of a close object can be filtered from the signals from the sensors by a receiving processor. Or, each sensor 304 may include multiple elements, with each element sensitive to a respective portion of the light spectrum.

FIGS. 4-8 illustrate various layouts and combinations of display elements consistent with present principles. In FIG. 4, three-pixel elements 302 are grouped in a square layout with a respective sensor 304 to establish a combined pixel 400. In FIG. 5, three red, green, and blue pixel elements 302 are grouped with three red, green, and blue sensor elements 500 to establish a combined pixel 502. In FIG. 6, three red, green, and blue pixel elements 302 are grouped with a single respective sensor 304 and an infrared (IR) emitter 600 to establish a combined pixel 602. In FIG. 7, three red, green, and blue pixel elements 302 are grouped with an IR emitter 600, an IR sensor 700, and a sensor 304 of three red, green, and blue sub-sensors to establish a combined pixel 702. In FIG. 8, three red, green, and blue pixel elements 302 arranged in small interior triangle are grouped with three red, green, and blue sub-sensors arranged in a larger, exterior triangle that encompasses the smaller sub-pixel triangle as shown to establish a resulting combined pixel 800. Also included within the combined pixel 800 may be an IR emitter 600 and an IR sensor 700. Note that any of the combined pixels illustrated in FIGS. 4-8 may be arranged in pixel locations in a matrix display.

Figure 9:
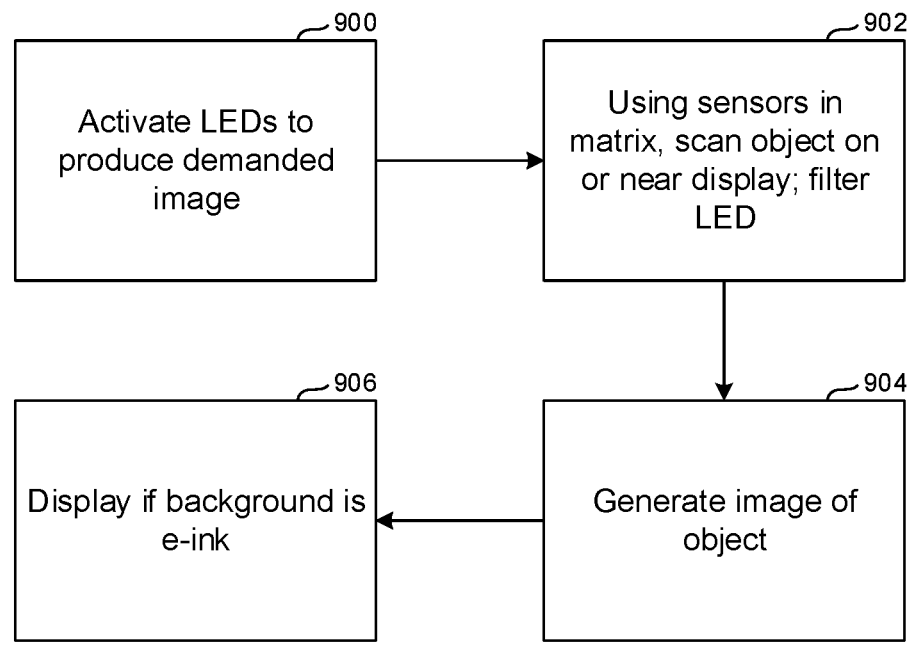
FIG. 9 is a flow chart of example logic consistent with present principles.

With the above in mind, attention is now drawn to FIG. 9, which illustrates logic that may be implemented by any of the processors described herein. At block 900 the pixels 300 are activated to produce demanded images from, e.g., a photo file, a video stream, etc. A flat object, such as a document, drawing, or photograph or a finger pressed against the display surface may be positioned against the surface of the display to allow the sensors 304 to work as a document or fingerprint scanner at block 902. At block 904, the processor generates an image of the scanned document or finger based on the signals from the sensors 304. Note that the number of sensor elements or sets of sensor elements do not need to correspond to the number of sets of light emitting elements as the sensors and display pixels can be at different resolutions. Similarly, in implementations that include IR emitter elements there may be one IR emitter per display pixel, or the resolution of IR emitter elements may differ from the display pixel resolution and or the sensor element resolution.

When the display background is e-ink as described above in reference to FIG. 2, at block 906 the image of the scanned object may be presented on the e-ink background, with the demanded image established by the pixels being superimposed on the scanned document image or being dimmed or removed briefly altogether from display to permit seeing the scanned document presented on the e-ink. Alternatively, the light emitting pixels may be used to display the image of the scanned object, in which case the image of the scanned object should be flipped in software so that an image of the object as it was scanned, and not a mirror image, is presented.

Figure 10:
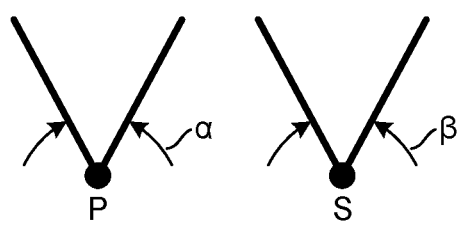
FIGS. 10 and 11 are schematic diagrams of fields of view (FOV) of a pixel element and a sensor element, showing, respectively, that the two elements can have the same or different FOVs.
Figure 11:
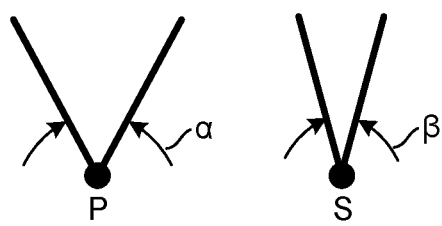

Turning now to FIGS. 10 and 11, a pixel element "P" may define a first field of view (FOV) characterized by a field angle α while a sensor or sensor element "S" may define a second FOV characterized by a field angle β. In FIG. 10 the FOV angles α and β are the same, whereas in FIG. 11 they are different, and specifically the FOV of the sensor is narrower than that of the pixel. Typically, the FOV will be almost 180 degrees.

As understood herein, the wider the FOV is of the sensors, the closer an object must be to the display to create a sharply focused image. This can be advantageous for privacy, because an object such as a document that is only a small distance from the display would only be able to be sensed as a very blurry image. The FOV of the sensors should be narrow enough to not overlap with other sensors too much for an item in contact with the display, and should not detect the light directly from the light emitting elements.

Figure 12:
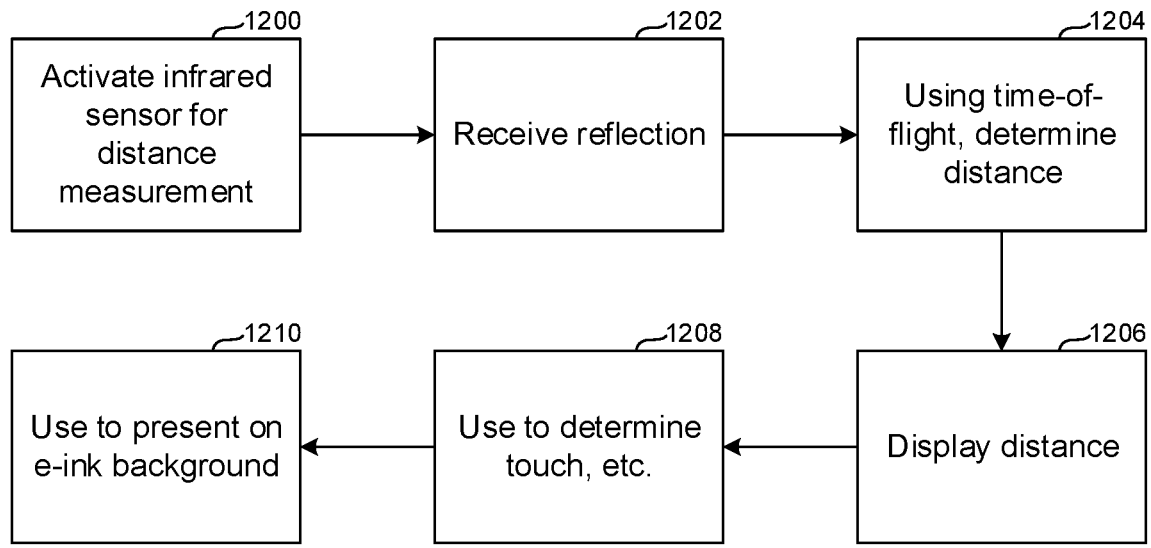
FIG. 12 is a flow chart of additional example logic consistent with present principles.

FIG. 12 illustrates additional logic that may be implemented by any of the processors herein consistent with present principles. At block 1200 an IR emitter/sensor may be activated for distance measurement. The light emitted by the emitter may be pulsed. A reflection of the light transmitted by the IR emitter 600 is detected by an IR sensor 700 at block 1202, and using time-of-flight (TOF) principles based on the time period between transmission and detection, at block 1204 a distance to a reflecting object is determined. The distance may be displayed at block 1206, and at block 1208 may be additionally used to determine whether the reflecting object is sufficiently close to the display to indicate a touch, e.g., by comparing the distance to a touch threshold. The portion of the display the touch is closest to is thus determined with increasing precision as the object gets closer to the screen so that touch input may be effected in this manner. Also, it may be determined which sensors have a document placed over them for scanning. At block 1201 the distance may be used to present information on the e-ink background.

Note that the IR detector may advantageously have a relatively narrow FOV to improve the resolution of the detectors for objects that are not extremely close to the display. For example, a narrow FOV can increase the distance at which gestures can be detected. Gestures performed above or in front of the display can thus be detected and can be used as a form of UI input.

Figure 13:
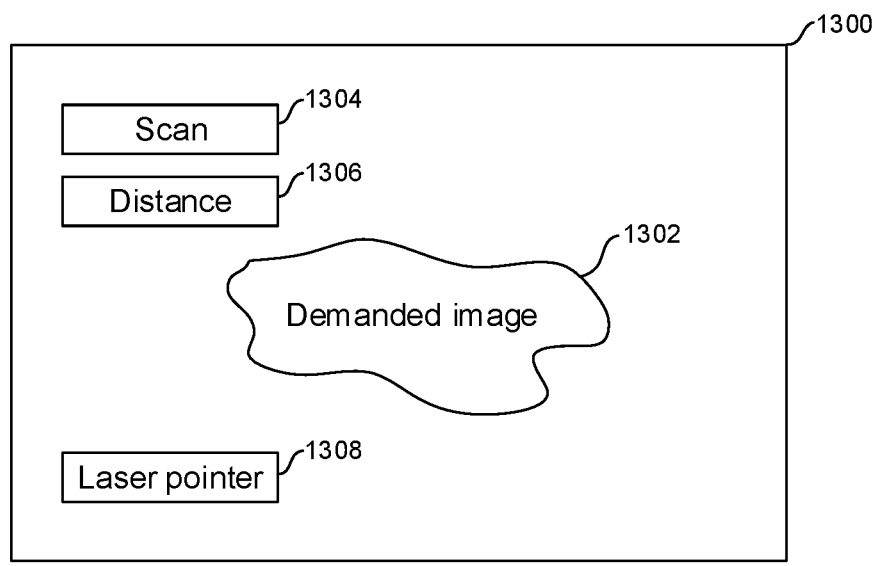
FIGS. 13-15 are example screen shots of various features for an e-ink background of the LED matrix.
Figure 14:
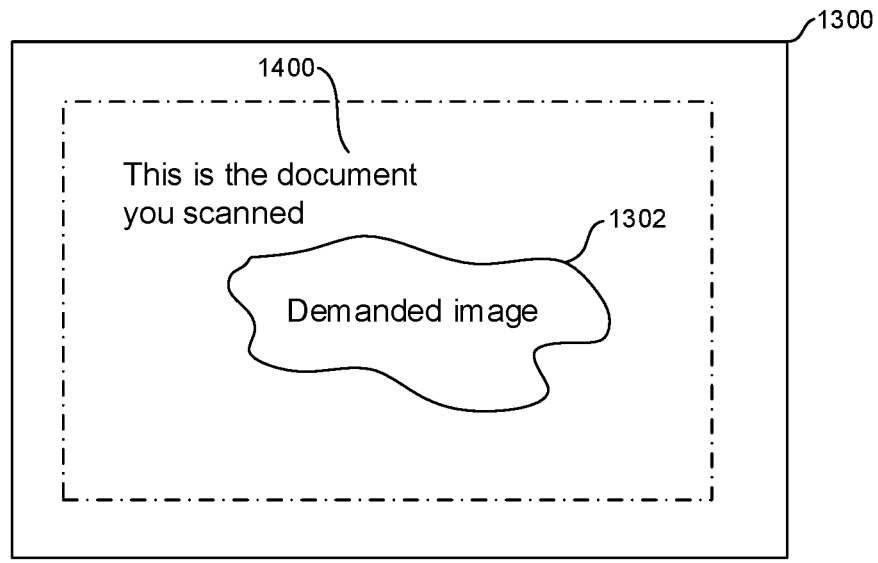
Figure 15:
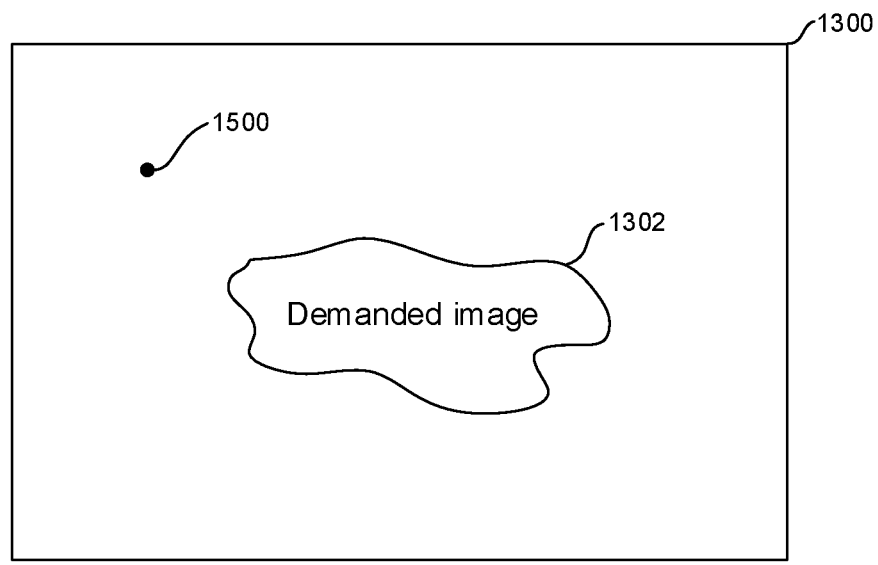

FIGS. 13-15 illustrate various example presentations on the display consistent with present principles. In FIG. 13, a display 1300 such as any of those described in FIGS. 2-12 presents a demanded image 1302 according to disclosure above. User interface (UI) controls may also be presented, e.g., using the e-ink background. For example, a scan selector 1304 may be presented and may be selectable to cause the processor to begin processing signals from the sensors 304 as scanning signals for generating an image of a document or fingerprint. A distance selector 1306 may be presented and may be selectable to invoke the logic of FIG. 12. Also, a laser pointer selector 1308 may be presented and may be selectable to activate a laser sensor such as one or more of the IR sensors 700 to detect a laser beam from, e.g., a laser pointer, so that the display may be used as a laser pointer screen as discussed further below.

FIG. 14 illustrates that the display 1300 presents the demanded image 1302 according to principles above and also an image 1400 on the e-ink background of a document that was scanned. FIG. 15 illustrates that the display 1300 presents the demanded image 1302 according to principles above and also an image 1500 of a dot, e.g., a red dot, at the location on the display at which a laser beam from a laser pointer was detected. The image 1500 may be presented using the e-ink background and/or by activating the appropriate sub-pixels 302 of the light emitting array of the display.

In some implementations laser pointers can be used that modulate the laser light output in a pattern of pulses. A laser pointer can change the pattern of pulses it generates in response to user input, such as pressing a button on the laser pointer, voice input, etc. A processor monitoring the detectors can detect the change in the pattern of pulses and ascertain which pattern is being emitted by the laser pointer, changing a mode of operation based thereon. This feature may be used, for example, to allow someone to use the laser pointer for pointing during a presentation in a first mode of operation, and then, e.g., press a button on the laser pointer to start drawing at the position on the screen where the laser pointer is aimed (second mode of operation). This allows the user to align where he wishes to start drawing on the screen very precisely before he begins drawing. In other implementations, pressing a button on the laser pointer to enter the second mode of operation can be interpreted as a click by the display processor. In some implementations, different pulse patterns can be used to have laser pointers draw on the display in multiple colors (a first color drawn in a first mode and a second color drawn in a second mode). Or, the second mode may be to display various color dots where the laser is detected, and drawing lines as the laser moves. The action can change as the pulse pattern of the laser changes, such as drawing a line where the laser is pointed only when a certain pulse pattern is detected, or drawing with various different colors and/or brushes based on the pulse pattern detected. A laser can be used to control a cursor, where the cursor moves based on where the laser is pointed, and changes in the pulse pattern can be interpreted as a click or drag.

To scan a document or photograph placed on the display with a display that has light sensing elements that sense light over a broad spectrum the display can alternate emitting light from the red, blue, and green light emitting elements and use the sensors to detect the light reflected off of the item in each of those color spectrums. If the display has separate sensor elements for red, blue and green, then all three-color frequencies can be scanned at the same time by illuminating using all light bands.

To scan a display, separate red, green and blue sensor elements may be provided to produce a color image. Because the display emits its own light, no illumination is needed.

Any combination of display elements discussed herein is contemplated. For example, in some implementations the display may have light emitting elements and IR receivers, but not have sensor elements. Some such an implementation may also be combined with an e-ink layer while other such implementations may not have an e-ink layer.

In some implementations, some portions of the display may have sensor elements, while other portions of the display may not have sensor elements. This can be a security benefit as only documents placed on the particular portion of the display that contains the sensor elements can be detected by the system, so someone with such a display built into his desktop can be confident that documents placed on certain portions of the display cannot be scanned, even if the software controlling the display is hacked. Similarly, IR receiver elements and/or an e-ink background can be present in some portions of the display but not in other portions of the display.

In displays with e-ink background substrates, the light emitting elements can be used to highlight things displayed on the e-ink layer, such as giving a glow or coloration to a tab or menu item that is currently selected. The e-ink is better at displaying static portions of the display, and thus can be used to highlight an area that will be used for scanning, while the light emitting elements can be used for more dynamic UI elements. If a portion of the UI is not fast changing then it can be displayed with the e-ink layer to reduce the power consumption.

It will be appreciated that whilst present principals have been described with reference to some example embodiments, these are not intended to be limiting, and that various alternative arrangements may be used to implement the subject matter claimed herein.

What is claimed is:

1. An apparatus comprising:
   at least one array of light emitting pixel elements controllable to present light, the light forming demanded images;
   at least one light sensor in the array and configured to detect reflections of the light from an object to generate an image of the object; and
   an e-ink substrate on a first side of the array to present the image of the object generated by the at least one light sensor,
   such that when no demanded image light is being emitted by the array, the image of the object generated by the at least one light sensor and presented by the e-ink substrate is visible through the array.

2. The apparatus of claim 1, wherein the pixel elements comprise red, green, and blue light emitting diodes (LED) and the apparatus comprises plural light sensors configured for outputting signals representing a scanned image.

3. The apparatus of claim 1, wherein the at least one light sensor comprises at least one infrared (IR) detector.

4. The apparatus of claim 1, comprising at least one processor configured with executable instructions to:
   determine, based on output of the light sensor, a first pulse pattern from a laser;
   implement a first mode of operation of the apparatus corresponding to the first pulse pattern;
   determine, based on output of the light sensor, a second pulse pattern from the laser; and
   implement a second mode of operation of the apparatus corresponding to the second pulse pattern.

5. The apparatus of claim 1, wherein the at least one light sensor comprises at least one laser detector, and the apparatus comprises at least one processor configured with executable instructions to activate at least one-pixel element to indicate a laser pointer spot location based on signals from the laser detector.

6. The apparatus of claim 1, wherein the pixel elements establish a screen pixel, and the apparatus comprises a respective sensor element for each screen pixel.

7. The apparatus of claim 1, wherein the pixel elements establish a screen pixel, and the apparatus comprises a respective sensor element for some, but not all, screen pixels.

8. The apparatus of claim 1, wherein the pixel elements establish a screen pixel defining a first field of view (FOV), and the sensor element defines a second FOV that is the same as the first FOV.

9. The apparatus of claim 1, wherein the pixel elements establish a screen pixel defining a first field of view (FOV), and the sensor element defines a second FOV that is different than the first FOV.

10. The apparatus of claim 1, wherein the pixel elements are arranged in an interior triangle and the sensor elements are arranged in an exterior triangle that encompasses the interior triangle.

11. The apparatus of claim 1, wherein three pixel elements are grouped with a single respective sensor and an infrared (IR) emitter to establish a combined pixel.

12. The apparatus of claim 1, wherein three red, green, and blue pixel elements are grouped with an infrared (IR) emitter, an IR sensor and three red, green, and blue sub-sensors to establish a combined pixel.

13. The apparatus of claim 1, comprising at least one processor configured with executable instructions to:
   receive signals from the at least one light sensor generated from reflected light from the array to establish at least one image; and
   present the at least one image on the e-ink substrate.

14. The apparatus of claim 1, comprising at least one processor configured with executable instructions to:
   activate the light emitting pixel elements to illuminate visible features presented on the e-ink substrate.

15. An apparatus comprising:
   at least one array of light emitting pixel elements controllable to present demanded images; and
   plural light sensors in the array and configured to detect light, wherein
   the pixel elements establish a screen pixel defining a first field of view (FOV), and at least a first light sensor defines a second FOV that is different than the first FOV, at least a first region of the array comprises sensors and a second region of the array does not include sensors such that a document placed on the first region can be scanned by the sensors in the first region and the document cannot be scanned when placed on the second region.

16. An apparatus comprising:

at least one processor configured with instructions to:

control an array of pixel elements of a display to emit light, the light establishing at least one demanded images, and based on sensors in the array detecting reflections of the light from an object near or on the display, scan the object to generate an image of the object;

the apparatus further comprising an e-ink substrate on a first side of the array;

present the image of the object on the e-ink substrate; and deenergize the array such that when no demanded image light is being emitted by the array, the image of the object presented by the e-ink substrate is visible through the array.

17. The apparatus of claim 16, wherein the pixel elements comprise light emitting diodes (LED) presenting the image of the object.

18. The apparatus of claim 16, wherein the instructions are executable to:

correlate at least a first output of the sensors to a first gesture distanced from the display;

implement a first action responsive to the first gesture;

correlate at least a second output of the sensors to a second gesture distanced from the display; and implement a second action responsive to the second gesture.

* * * * *